(12) United States Patent
Palle et al.

(10) Patent No.: US 12,513,781 B2
(45) Date of Patent: Dec. 30, 2025

(54) ENTERPRISE CONTENT GATEWAY

(71) Applicant: Blonder Tongue Laboratories, Inc., Old Bridge, NJ (US)

(72) Inventors: Robert J. Palle, Freehold, NJ (US); Nezam T. Nikoo, Holmdel, NJ (US); James D. Haberly, Fort Wayne, IN (US); Joshua T. Blanton, Milford, OH (US); Donald Christie Young, Seminole, FL (US); Jeffrey W. Smith, Liberty Hill, TX (US)

(73) Assignee: Blonder Tongue Laboratories, Inc., Old Bridge, NJ (US)

( * ) Notice: Subject to any disclaimer, the term of this patent is extended or adjusted under 35 U.S.C. 154(b) by 464 days.

(21) Appl. No.: 18/194,959

(22) Filed: Apr. 3, 2023

(65) Prior Publication Data

US 2023/0247723 A1   Aug. 3, 2023

Related U.S. Application Data

(60) Continuation of application No. 17/022,605, filed on Sep. 16, 2020, now Pat. No. 11,622,417, which is a (Continued)

(51) Int. Cl.
*H04W 88/16* (2009.01)
*H04L 12/66* (2006.01)
(Continued)

(52) U.S. Cl.
CPC ............. *H04W 88/16* (2013.01); *H04L 12/66* (2013.01); *H04L 67/1001* (2022.05); *H04L 2012/5618* (2013.01); *H04L 49/354* (2013.01)

(58) Field of Classification Search
CPC .... H04W 88/16; H04L 12/66; H04L 67/1001; H04L 49/354; H04L 2012/5618;
(Continued)

(56) References Cited

U.S. PATENT DOCUMENTS 5,680,457 A   10/1997  Bestler et al.
6,434,126 B1 *  8/2002  Park ..................... H04Q 3/0029
                                                        455/433

(Continued)

FOREIGN PATENT DOCUMENTS

CN     101141267 B  *  4/2010
GB     2 354 883 A      4/2001
(Continued)

OTHER PUBLICATIONS

English abstract for KR 20090010564 A obtained from Espacenet Patent seach on Sep. 20, 2022.
(Continued)

*Primary Examiner* — Rownak Islam
(74) *Attorney, Agent, or Firm* — Woodard, Emhardt, Henry, Reeves & Wagner, LLP

(57) ABSTRACT

The disclosure relates to content delivery systems such as gateways for use in locations where the services of many end user devices are provided by a common management entity, such as hospitality, dormitory, healthcare, or other enterprise settings. The disclosure includes methods of initializing a gateway configuration and operating a gateway by ingesting content from a variety of signals (satellite, broadcast, cable, and IP), processing the content to have additional desired features, and reassembling content in various forms for delivery to individual end user devices.

20 Claims, 8 Drawing Sheets

Related U.S. Application Data division of application No. 15/722,643, filed on Oct. 2, 2017, now Pat. No. 10,785,829, which is a continuation of application No. PCT/US2017/025114, filed on Mar. 30, 2017.

(51) Int. Cl.
  *H04L 67/1001* (2022.01)
  *H04L 12/70* (2013.01)
  *H04L 49/354* (2022.01)

(58) Field of Classification Search
  CPC ............ H04N 21/2143; H04N 21/226; H04N 21/232; H04N 21/2347; H04N 21/236; H04N 21/2381; H04N 21/23895; H04N 21/2404; H04N 21/241; H04N 21/2541; H04N 21/2665; H04N 21/2668
  USPC ....................................................... 370/328
  See application file for complete search history.

(56) References Cited

U.S. PATENT DOCUMENTS

| | | |
|---|---|---|
| 6,490,727 B1 | 12/2002 | Nazarathy et al. |
| 6,611,867 B1 | 8/2003 | Bowman-Amuah |
| 6,640,239 B1 | 10/2003 | Gidwani |
| 6,650,624 B1 | 11/2003 | Quigley et al. |
| 7,039,048 B1 | 5/2006 | Monta et al. |
| 7,058,559 B1 | 6/2006 | Roeck et al. |
| 7,149,223 B2 | 12/2006 | Liva et al. |
| 7,592,912 B2 | 9/2009 | Hasek et al. |
| 7,688,828 B2 | 3/2010 | Chapman et al. |
| 7,746,878 B2 | 6/2010 | Cha |
| 7,787,439 B1 | 8/2010 | Oz et al. |
| 7,934,228 B2 | 4/2011 | Miner |
| 7,954,131 B2 | 5/2011 | Cholas et al. |
| 8,239,913 B2 | 8/2012 | Munsell et al. |
| 8,345,778 B2 | 1/2013 | Kennedy et al. |
| 8,438,607 B2 | 5/2013 | Cholas et al. |
| 8,472,871 B2 | 6/2013 | Barroso |
| 8,498,294 B1 | 7/2013 | Monk et al. |
| 8,503,447 B2 | 8/2013 | Lee et al. |
| 8,584,255 B2 | 11/2013 | Barry et al. |
| 8,619,822 B2 | 12/2013 | Munsell et al. |
| 8,792,336 B2 | 7/2014 | Barroso |
| 8,804,499 B2 | 8/2014 | Barroso |
| 8,804,696 B1 | 8/2014 | Krishnamurthy et al. |
| 8,863,201 B2 | 10/2014 | Brooks et al. |
| 8,875,190 B2 | 10/2014 | Barroso |
| 8,973,058 B2 | 3/2015 | Barroso |
| 9,027,062 B2 | 5/2015 | Patel et al. |
| 9,055,316 B2 | 6/2015 | Munsell et al. |
| 9,094,732 B2 | 7/2015 | Lerner et al. |
| 9,131,283 B2 | 9/2015 | Patel et al. |
| 9,319,755 B2 | 4/2016 | Fusco et al. |
| 9,357,247 B2 | 5/2016 | Cronk et al. |
| 9,398,336 B2 | 7/2016 | Markley et al. |
| 9,461,758 B2 | 10/2016 | Barroso |
| 9,479,834 B2 | 10/2016 | Elstermann et al. |
| 9,509,396 B2 | 11/2016 | Petrovic et al. |
| 9,531,760 B2 | 12/2016 | Lajoie et al. |
| 9,743,383 B1 | 8/2017 | Norin |
| 2002/0056125 A1 | 5/2002 | Hodge et al. |
| 2002/0129379 A1 | 9/2002 | Levinson et al. |
| 2002/0159513 A1 | 10/2002 | Williams et al. |
| 2003/0046359 A1 | 3/2003 | Betz et al. |
| 2003/0070181 A1 | 4/2003 | Holm |
| 2003/0114112 A1 | 6/2003 | Strater et al. |
| 2003/0212802 A1 | 11/2003 | Rector et al. |
| 2004/0046032 A1 | 3/2004 | Cummings et al. |
| 2004/0172658 A1 | 9/2004 | Rakib et al. |
| 2004/0244049 A1 | 12/2004 | Hahin et al. |
| 2004/0260069 A1 | 12/2004 | Ramelson et al. |
| 2005/0027766 A1 | 2/2005 | Kim et al. |
| 2006/0085727 A1 | 4/2006 | Azenkof et al. |
| 2007/0143806 A1 | 6/2007 | Pan |
| 2007/0217436 A1 | 9/2007 | Markley et al. |
| 2007/0240232 A1 | 10/2007 | Pino et al. |
| 2007/0250872 A1 | 10/2007 | Dua |
| 2008/0076354 A1 | 3/2008 | Rofougaran |
| 2008/0092188 A1 | 4/2008 | Rofougaran |
| 2008/0098450 A1 | 4/2008 | Wu et al. |
| 2008/0120667 A1 | 5/2008 | Zaltsman |
| 2008/0120675 A1 | 5/2008 | Morad et al. |
| 2008/0155630 A1 | 6/2008 | Oosawa |
| 2008/0170853 A1 | 7/2008 | Rakib et al. |
| 2008/0266402 A1 | 10/2008 | Wu et al. |
| 2009/0025042 A1 | 1/2009 | Lubbers et al. |
| 2009/0036159 A1 | 2/2009 | Chen |
| 2009/0232077 A1 | 9/2009 | Krieger et al. |
| 2010/0017833 A1 | 1/2010 | Abramson et al. |
| 2010/0079679 A1 | 4/2010 | Kulczyckyj et al. |
| 2010/0097528 A1 | 4/2010 | Seo |
| 2010/0131980 A1 | 5/2010 | Rodriguez et al. |
| 2010/0157817 A1 | 6/2010 | Mergler et al. |
| 2010/0169279 A1 | 7/2010 | Loi et al. |
| 2010/0177750 A1 | 7/2010 | Essinger et al. |
| 2010/0180291 A1 | 7/2010 | Kahn et al. |
| 2010/0239026 A1 | 9/2010 | Veljkovic et al. |
| 2010/0325670 A1 | 12/2010 | Strong et al. |
| 2010/0325672 A1 | 12/2010 | Barnett, Jr. et al. |
| 2011/0059690 A1 | 3/2011 | Petruzzelli |
| 2011/0093900 A1 | 4/2011 | Patel et al. |
| 2011/0107404 A1 | 5/2011 | Ramsdell et al. |
| 2011/0182180 A1 | 7/2011 | Riddle |
| 2011/0191797 A1 | 8/2011 | Lee et al. |
| 2011/0310297 A1 | 12/2011 | Gawel et al. |
| 2012/0016951 A1 | 1/2012 | Li et al. |
| 2012/0163290 A1 | 6/2012 | Krafft et al. |
| 2013/0073977 A1 | 3/2013 | Foote |
| 2013/0151646 A1 | 6/2013 | Chidambaram et al. |
| 2013/0177154 A1 | 7/2013 | Hill-Jowett |
| 2013/0203338 A1 | 8/2013 | Ling et al. |
| 2013/0215589 A1 | 8/2013 | Nowak et al. |
| 2014/0006667 A1 | 1/2014 | Sun et al. |
| 2014/0020019 A1 | 1/2014 | Carter et al. |
| 2014/0053017 A1 | 2/2014 | Bartlett et al. |
| 2014/0059632 A1 | 2/2014 | McMullin et al. |
| 2014/0075468 A1 | 3/2014 | Lee et al. |
| 2014/0181883 A1 | 6/2014 | Schroeder |
| 2014/0237509 A1 | 8/2014 | Bishop et al. |
| 2014/0281481 A1 | 9/2014 | Moroney |
| 2014/0282785 A1 | 9/2014 | Bowler et al. |
| 2014/0341109 A1 | 11/2014 | Cartmell et al. |
| 2014/0373076 A1 | 12/2014 | Lerner et al. |
| 2015/0020134 A1 | 1/2015 | Bowler et al. |
| 2015/0026750 A1 | 1/2015 | Wachob et al. |
| 2015/0095935 A1 | 4/2015 | Laksono |
| 2015/0237658 A1 | 8/2015 | Fontaine et al. |
| 2016/0011894 A1 | 1/2016 | Reddy et al. |
| 2016/0134459 A1 | 5/2016 | Zaltsman et al. |
| 2016/0150272 A1 | 5/2016 | Markley et al. |
| 2016/0156941 A9 | 6/2016 | Alao et al. |
| 2016/0174129 A1 | 6/2016 | McNamee et al. |
| 2016/0212473 A1 | 7/2016 | Zhuang et al. |
| 2016/0227157 A1 | 8/2016 | Zhong |
| 2016/0269775 A1 | 9/2016 | Cholas et al. |
| 2016/0294476 A1 | 10/2016 | Sun et al. |
| 2016/0309043 A1 | 10/2016 | Hicks, III |
| 2016/0329632 A1 | 11/2016 | Caratelli |
| 2016/0330200 A1 | 11/2016 | Ansari et al. |
| 2016/0381431 A1 | 12/2016 | Patterson et al. |
| 2017/0019689 A1 | 1/2017 | Ahmad |
| 2017/0054698 A1 | 2/2017 | Garcia |
| 2017/0055013 A1 | 2/2017 | Hasek et al. |
| 2017/0070395 A1 | 3/2017 | Ansari et al. |

(56) References Cited

U.S. PATENT DOCUMENTS

2019/0363753 A1 11/2019 Alkan
2020/0252375 A1 8/2020 Chen et al.

FOREIGN PATENT DOCUMENTS

JP  2006509446 A * 3/2006 ............ H04W 48/10
KR  20090010564 A  1/2009
WO  WO 2016/160262 A1  10/2016

OTHER PUBLICATIONS

Search report and Written opinion dated Aug. 3, 2017, PCT Application No. PCT/US2017/025114,.
Sophia-Antipolis, Access, Terminals, Transmission and Multiplexing (ATTM) Integrated Broadband Cable and Television Networks Converged Multiservice Access Platform Architecture, European Telecommunications Standards Institute (ETSI), 650, Route DES Lucioles, F-06921, ETSI Draft; AT3013V001 Mar. 3, 2011 (Mar. 3, 2011) pp. 1-39 [retrieved on Mar. 3, 2011].
Supplemental Partial European Search Report in Application EP 17 90 3385.7, issued Nov. 2, 2020, 14 pages.
Search report and Written opinion, PCT/US2017/055342, dated Dec. 26, 2017.

* cited by examiner

ENTERPRISE CONTENT GATEWAY

CROSS REFERENCE TO RELATED APPLICATIONS

This application is a continuation of U.S. patent application Ser. No. 17/022,605, filed Sep. 16, 2020, which is a divisional of U.S. patent application Ser. No. 15/722,643, filed Oct. 2, 2017, which is a continuation of International Patent Application No. PCT/US2017/025114, filed Mar. 30, 2017, all of which are hereby incorporated by reference.

BACKGROUND

Content delivery networks employ a variety of different transmission modes. For example, networks can employ broadcast, satellite, cable, and/or the Internet and IP-based transmissions. Each of these transmissions can have physical or practical limitations and may operate using different transmission formats and protocols. Within each transmission medium, various types of information can be sent or received, including audio, video, audiovisual, telephony, or other forms of data. Additional complications can arise because a single service provider may employ multiple delivery networks simultaneously, such as a legacy network in combination with a fiber-based IP (internet protocol) system.

Typically, several different devices would be needed to process and handle content delivered through these different networks and transmission modes. The expense and maintenance of equipment for each of these functions can be burdensome. This multiplication of devices is compounded for certain enterprise customers that centrally manage services provided for many end-user points, such as hotels, educational institutions, multifamily housing, commercial buildings, hospitals, airports, or other multiple-dwelling units.

Enterprise customers may also desire to combine many different transmission modes for local delivery to its managed network using a smaller number of transmission modes and/or different transmission modes. For example, over-the-air television content could be combined with a network cable feed delivered over a hybrid-fiber network, with subsequent delivery over coaxial cable within the enterprise customer's network. A further complication is that both input and output may be subject to encryption or decryption problems. Enterprise customers may have additional desires to insert locally-generated programming into the content delivered into its network, such as local advertising, custom directory or guide information, or coverage of events occurring on the premises. All of these variations could require further additional equipment to implement.

BRIEF SUMMARY OF THE INVENTION

The present disclosure provides a powerful fully two-way platform that is adaptable to any enterprise service application. A gateway may be constructed from a chassis that is populated with appropriate processing or service modules to target the detailed requirements for each application. Subscription or network changes affecting the enterprise customer can be accommodated by reconfiguration of existing modules, replacement of existing modules with new modules, or installation of new modules.

An enterprise content gateway includes a passive backplane configured to receive a plurality of service modules, a power module, and a control module. The backplane transfers power and provides data transfer connections between service modules and the control module. Service modules include an input module configured to demodulate a signal to provide a transport stream to the backplane and an output module configured to receive transport streams from the passive backplane and produce a modulated signal. The control module includes a webserver hosting a remotely-accessible control interface, sends control data to the other modules, and receives monitoring data and transport streams from the other modules. The control module identifies programs from the transport streams to create a channel lineup and generates output instructions. In one implementation, the control module is also adapted to receive a content feed from an external IP port, and may include programs from the content feed in the channel lineup and output instructions. Output instructions and the streams including the selected programs are routed to the output module which assembles an output stream based on the instructions. Optionally, the control module can create multiple channel lineups for delivery through distinct output modules.

An enterprise content gateway may adapt to changes in the installed modules and configurations with minimal service interruptions. A newly-installed module sends an initialization message to the control module, which is compared to a system configuration plan. The system configuration plan may be stored in memory or received or updated from the control interface. The control module sends a control message to the service module with instructions for processing a transport stream according to the system configuration plan. The system configuration plan may be modified from the control interface, and the control module identifies service modules affected by the modification and propagates new control messages accordingly.

The enterprise content gateway also provides for improved communications with an external network. The gateway may collect data packages from multiple devices within the enterprise network and aggregate those into more aggregated packages that are transmitted through a single interface of the enterprise gateway. When used with an external network communicating with RF signals, the gateway substantially reduces the noise contribution that individual devices in the enterprise network would otherwise add to the external network. The gateway therefore enables various expanded and extended network architectures.

The disclosure also relates to automatically detecting and recovering from errors in a enterprise gateway setting. A system may load a system configuration plan with information about the expected number and types of input signals and receive an input from a service module. A signal status may be determined by comparing the input to the system configuration plan. Errors in cryptographic processes may also be detected. Errors of multiple types are reported and the system identifies unused resources which are available to correct the error(s). If an error persists, the spare resources may be deployed to correct the errors and return the system to operations conforming with the system configuration plan.

Other aspects of the disclosure relate to the detection and correction of cryptographic errors in a conditional access system. Without compromising security, a cryptographic engine may provide for a polling or query interrogation for information relating to its key exchanges and communications. In response to the interrogation, the cryptographic engine reports a record of its communications with the conditional access system. The record is evaluated against predefined rules and/or prior records for the detection of errors in key negotiations or storage prior to a cryptographic failure. Upon detecting the errors, a control message is sent to the cryptographic engine to restart and/or reauthenticate and renegotiate key information with the conditional access system. The restart may be delayed to minimize loss of service to downstream users.

DETAILED DESCRIPTION OF PREFERRED EMBODIMENTS

1. Structural and Operational Review

Figure 1:
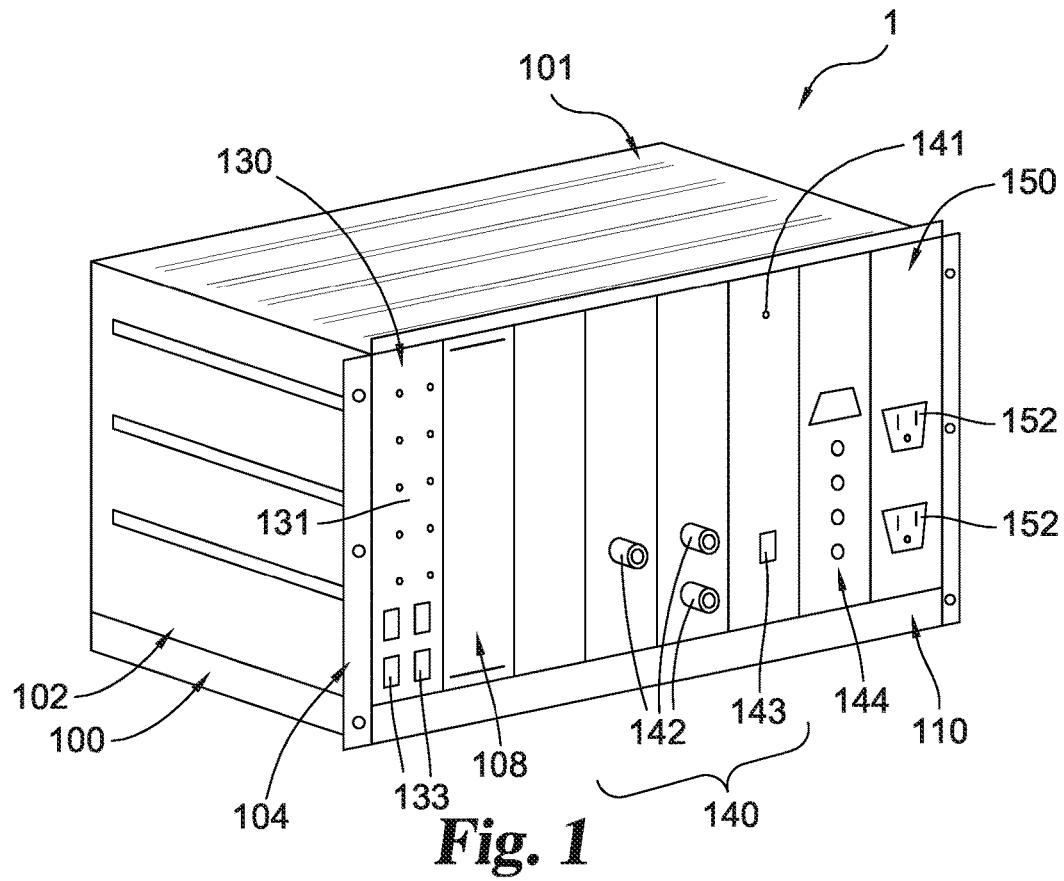
FIG. 1 is a perspective view of an exemplary implementation of an inventive gateway.

As shown in FIG. 1, a gateway 1 may be housed within a chassis 100 adapted to mount in a conventional equipment rack (not shown). For example, chassis 100 may be four or five "rack units" high (approximately seven to nine inches) and nineteen inches wide, although the chassis may be adapted to other configurations suitable for installation in a variety of settings. While different enclosures and configurations are compatible with the gateway, as shown here, the chassis 100 shown includes a top 101, louvered sides 102 with mounting sections 104, back wall 106 (see FIG. 2), a module support area 108, and a subchassis 110. The subchassis 110 may be removable from the chassis independent of the chassis's mounting to an equipment rack or other structure.

Figure 2:
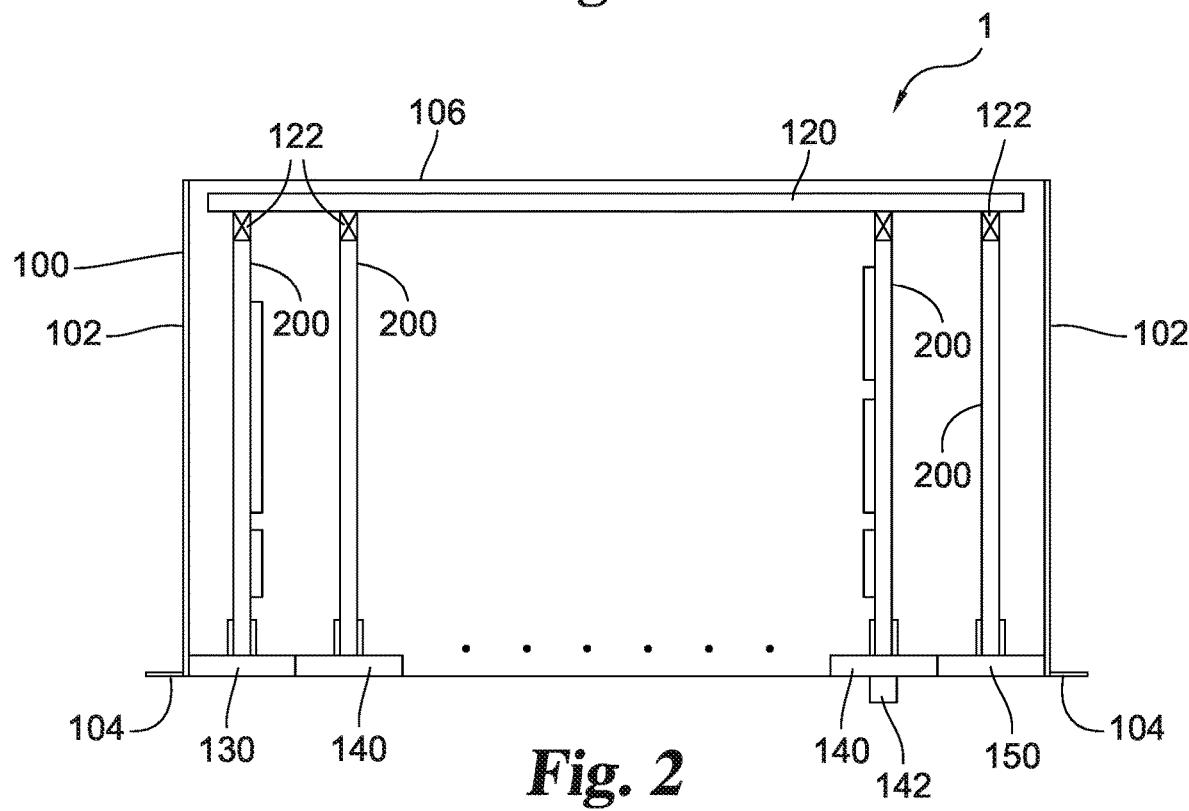
FIG. 2 is a top view of the gateway of FIG. 1 with its top removed.

FIG. 2 illustrates a top down view of FIG. 1 with top 101 removed. Chassis 100 houses a backplane 120 supported by the back wall 106. The backplane 120 is adapted to receive a variety of modules including control modules 130, service modules 140, and/or power modules 150, and provides data connections and power transfer between modules. For example, backplane 120 can be an Ethernet backplane providing multi-gigabit data transport on a single bus. Each of modules 130, 140, and 150 are shown implemented on a blade structure 200 which extends from front side toward backplane and contains or supports various processing and communications hardware as discussed throughout this disclosure. Backplane 120 may be configured with uniformly spaced connections to provide for any physical arrangement or sequencing of modules 130, 140, 150 or may be arranged to provide connections for specific types of modules in set locations, or some combination. For example, as shown in FIG. 1, relative to front of chassis 100, control module 130 is installed on or toward left side and power module 150 is installed on or toward the right side, with service modules 140 in between. Even in this arrangement, however, connections for service modules 140 may be uniformly spaced such that they can be installed in any sequence.

Modules 130, 140, 150 can be constructed such that no external connections are required from the rear of the device. For example, in FIG. 1, a service module 140 is shown with a coaxial outlet 142 on the front side of the device. In a preferred implementation, the backplane 120 can be a passive backplane in that it lacks active electronics components. The lack of active components makes failure of the backplane unlikely in service, which eases the burden on field-service and repairs as well as eliminates the need for accessing the backplane 120 or any module from the back of the gateway 1, providing more flexibility in installation. It is particularly helpful to ease of repair by replacing service modules, that the more failure prone active components, such as high speed data handling components or computationally-intensive video processing, are not present as a part of the backplane. In addition to supporting and connecting modules 130, 140, 150, backplane 120 can be adapted to provide supporting and connections for data and power transfer for an environmental unit 160 housed in subchassis 110 and described below.

Control module 130 is in communication with all other modules, such as service modules 140 in FIG. 1, through connections with backplane 120. The control module 130 provides a central input and output signal conditioning, management, communication, monitoring, and control system. Control module sends control data to other modules; receives monitoring data and transport streams from other modules; identifies programs for inclusion in a channel lineup; and creates instructions for assembling a channel lineup which are routed to an output module 140 (described further below). As shown here, control module 130 may be equipped with an IP port 133, or multiple such IP ports. Optionally, IP inputs may also be provided in a separate service module described more fully below. Control module 130 may include indicators 131 such as LEDs or other signaling means to indicate status of components and/or functions of the gateway 1. Control module 130 may also be configured to perform various methods, either alone or in combination with other modules, as described further below.

Power module 150 features two power supply sockets 152 for redundant, independent power sources, and transfers power to the other modules through backplane 120. The gateway may be implemented with dual power supplies, each with sufficient capacity to supply the other modules. Redundant power supplies may be equipped with auto-failover features to prevent outages or service interruptions. Power module 150 may be equipped with a dedicated fan unit 156 for heat dissipation. Power module 150 may be configured to report monitoring or alert information to control unit 130 via interconnects 122 and data paths 124, such as an alert when one power supply fails or is disconnected and an auto-failover event occurs. Control unit 130 may be configured to evaluate the monitoring and alert information and, as needed, automatically order service or relay information to the control interface or a remote monitor.

Figure 5A:
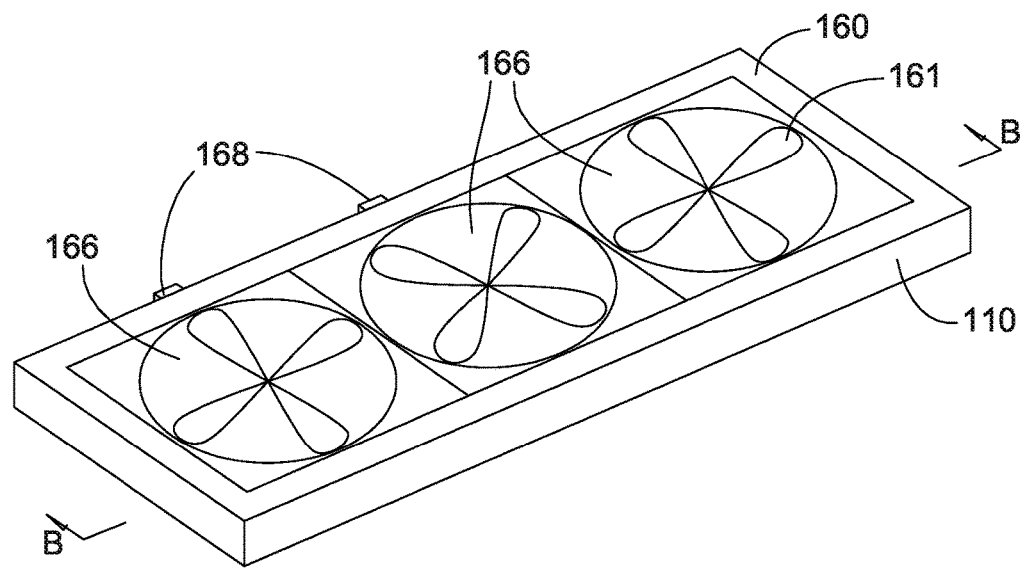
FIG. 5A is a perspective view of a subassembly of the gateway of FIG. 1.
Figure 5B:
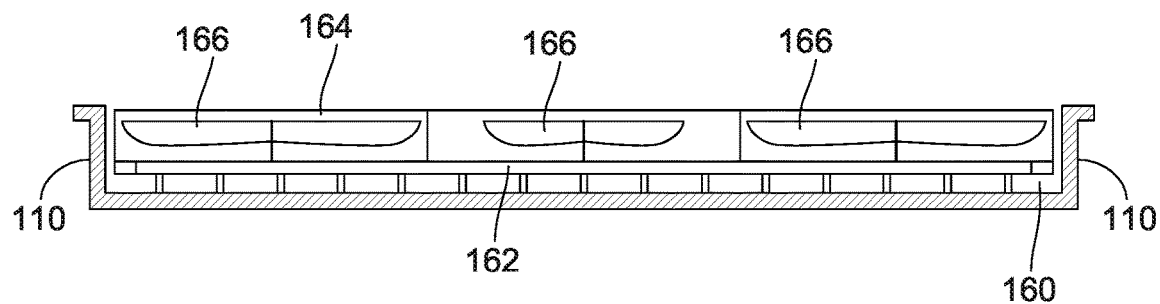
FIG. 5B is a cross-sectional view of FIG. 5A taken along the dashed line B.

As shown most clearly in FIGS. 5A and 5B, the subchassis 110 may house an environmental module 160 that regulates airflow throughout the gateway 1. Environmental module 160 may be equipped with an air filter 162 and a fan assembly 164. Fan assembly 164 includes fans 166 and may be equipped with both power and data connections 168 to backplane 120. Fan assembly may be configured to report power usage, temperature, and/or fan speeds to control module 130. In operation, the use of multiple fans 166 in fan assembly 164 provides redundancy against individual component failure. Moreover, in conjunction with the removable subchassis 110, in the event of a failure of one or more fans 166, advantages to repair servicing are obtained. The control module 130 may monitor fan speed and temperature reports and identify a failure so that alerts can be generated and repair services ordered. For repair and replacement purposes, the fan assembly 164 with its multiple fans is hot-swappable similar to the manner described above with respect to service modules 130. As an alternative to quickly replacing the entire fan assembly 164 and subchassis 110 with a duplicate while the gateway system is operational, the subchassis 110 can be removed and the entire environmental module 160 within it, or an individual fan within it, may be replaced prior to reinstalling subchassis 110 into the chassis 100.

Repair operations can be accomplished while the gateway 1 continues to process signals and route content so that enterprise users do not lose service unless the sensed temperature reaches an unacceptable level before the fan assembly 164 is replaced. The speed of removal and reinstallation avoids adverse temperature effects on the hardware in modules 130, 140, 150. As shown in FIGS. 1 and 2, environmental module may be substantially oriented perpendicular to the orientation of modules 130, 140, 150. One environmental module 160 therefore may service multiple or all modules simultaneously.

Figure 3:
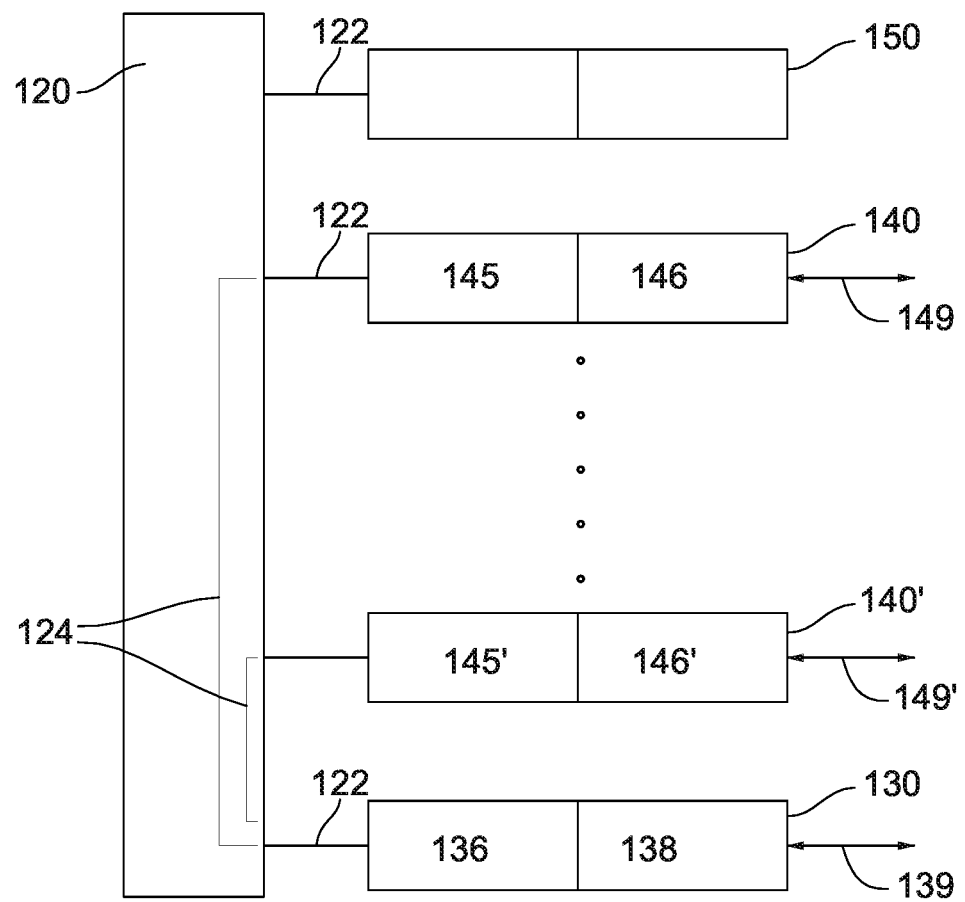
FIG. 3 is a block diagram of data processing in accordance with an inventive gateway of FIG. 1.
Figure 4:
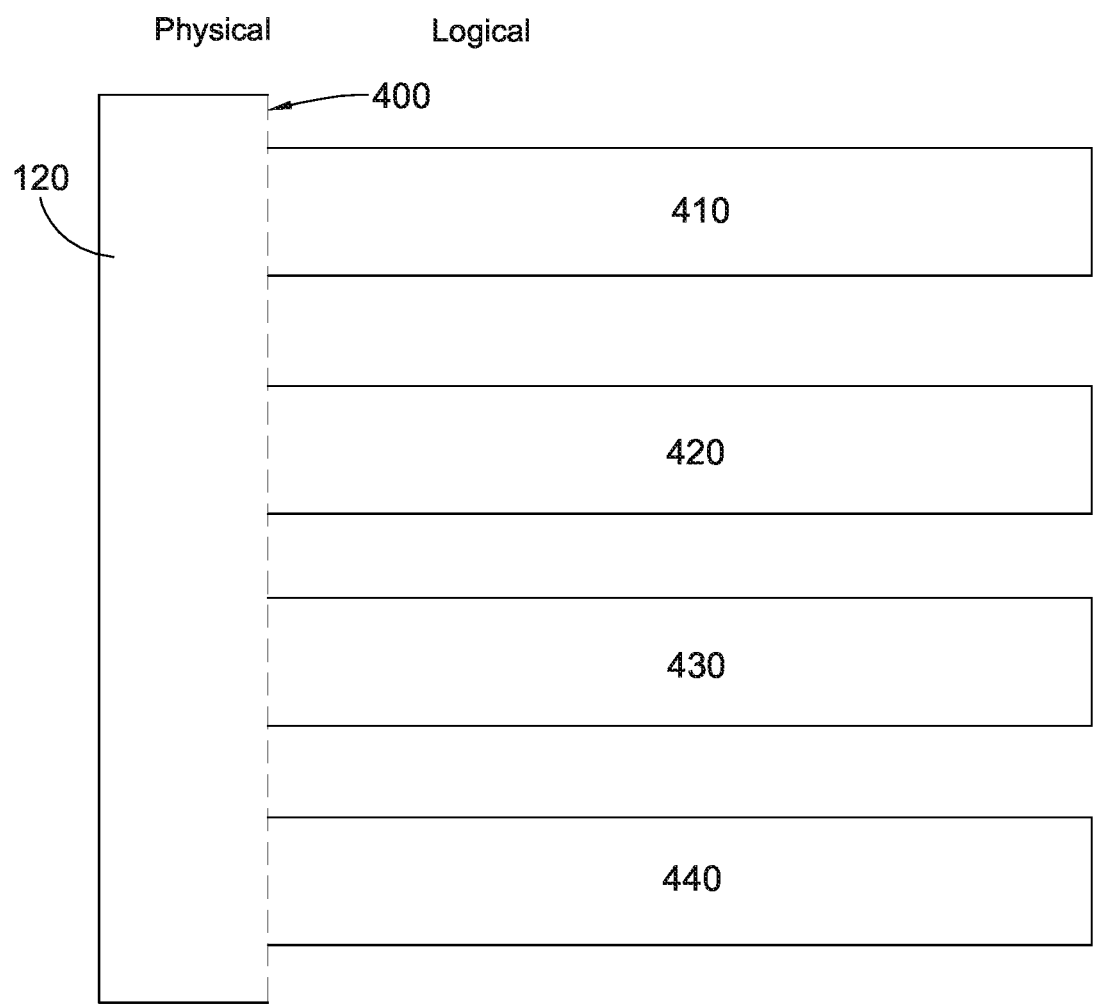
FIG. 4 is a diagram of logical data partitioning in an inventive gateway, such as FIG. 1.

In FIG. 3, control module 130 of FIG. 1 can be defined in relation to switch functions 136 and processing functions 138, and is shown with data interconnects 122 to backplane 120 as well as an optional input/output signal 139. Implementation options include using an integrated circuit for switch functions 136 while using field programmable gate arrays (FPGAs) for processing functions 138, although other processor types and combined hardware/software solutions would be available. Backplane 120 may provide unique paths 124 between control module 130 and each service module 140. For example, each path 124 may be a 2.5 Gb Ethernet connection that is independent of the other paths 124. The processing functions 138 include an operating system, webserver providing a control interface, monitoring and control messaging, and optionally external network communications. In connection with managing the routing of data between service modules, switch functions 136 may provide firewalled data partitioning among different types of data within the system, such as logical VLAN partitioning. For example, in FIG. 4, boundary 400 illustrates the distinction between physical and logical data partitioning in any given blade, where a path 124 of FIG. 3 represents the physical connection that is available between the control module 130 and a given service module 140. Control module 130 may assign separate partition labels to, for example, common control and configuration data 410, external network data 420, multimedia transfer data 430, or other categories 440. Data partitioning has several benefits, including enhanced security (e.g., isolating external data from control processes and settings) and lowering the data rate required for the backplane to service any given service module 140.

Illustrated in FIG. 3, service modules 140 can be defined in relation to standard module functions 145 and specialized module functions 146. Standard module functions include an operating system, network connectivity with the backplane such as Ethernet connections, a processor capability, and a webserver. An illustrated implementation provides all of these functions on a physical blade structure 200 (such as with 130, 140 and 150) terminating with a data interconnect 122 (FIG. 2). A given service module 140 may have an associated input/output signal 149. Each service module 140 is connected to control module 130 through dedicated data path 124. The service module webserver is configured to supply a module-specific control interface to the control interface, and may also supply alert and monitoring information specific to the service module 140. A preferred implementation uses FPGAs on each service module. By processing with FPGAs, less power is consumed (and less heat generated) than with a standard microprocessor. FPGA blades also provide reliable data connectivity with an Ethernet backplane.

Service modules 140 are usually "hot-swappable," meaning that they can be replaced without powering down other components of the gateway and minimize any loss of service associated with replacement. Likewise, the system can be reconfigured so that the hot-swappable service modules are immediately reassigned to process data according to a new configuration. Upon installing a service module 140, the service module may send an initialization message to the control module. An initialization message may include identification, capacity, type, and status information for the service module. Information from the initialization message may be communicated to and displayed on the control interface. The control module compares the initialization message to a stored system configuration plan. If the service module is compatible with the processing needs of the plan, then the module may be placed into service. The control module may send a control message to the service module including instructions for processing data based on the system configuration plan. Instructions for processing data will typically relate to a transport stream according to the various types of modules discussed in detail below, and control module may route a transport stream to the service module for handling. If the service module is compatible with the plan but there are other resources already providing the compatible functions, the service module may be designated a "hot spare" as discussed further below. Alternately, the compatible service module may reduce the load on the previously-functioning module performing the same function. Thus, excess processing capacity may be provided to enhance services within the enterprise network, for example, by providing higher-quality content. A user may request to modify the system configuration plan using the control interface. In response to such a request, the control module may modify the stored system configuration plan and identify one or more service modules affected by the request, for example by comparing the newly stored configuration plan to the previously-stored configuration plan.

The control interface of the control module is configured to communicate with the module-specific webserver, and provides a central authentication system for command-and-control of the individual modules. The control interface will receive and recreate the module-specific control interface from the module-specific webserver. When a change to a configuration is recorded in the control interface, the control module may identify each affected service module and send control data communicating the change. The control module webserver may receive monitoring data and/or alerts from each respective module-specific webserver, which may be available through or displayed in the control interface.

Returning to FIG. 3, a second service module 140' is illustrated, with standard module functions 145', specialized module functions 146' (and optionally input/output signal 149'), which may or may not differ from service module 140, depending on the specific application. Service module 140' may be of a different type than service module 140. However, service module 140' may be of the same type as service module 140, yet configured to process data in different ways, or configured to process different sets of data. Having completed a discussion of standard module functions above, specialized module functions 146 and 146' are described herein below in connection with the many different module types that can be employed in an inventive gateway.

2. Service Module Types and Processing Options

Input service modules are provided in a variety of types based on the incoming signals that will require processing. One example is a QAM input module, which is adapted to receive QAM-modulated signals through a coaxial cable connected through the front of the module and further configured to demodulate such signals to digital transport streams that can be provided to other modules via the backplane 120. A QAM input module includes multiple full-band-capture QAM tuners. Optionally, a QAM input module may include a cryptographic engine that decrypts digital channels as part of a conditional access system, such as the CableCARD™ system that is commercially available. Each QAM input module may be outfitted with multiple, multi-stream decryption cards (referred to as an "M-CARD"), each of which is capable of decoding up to six channels simultaneously. Each M-CARD may be received in a physical pocket on the blade that provides data connectivity with the blade. In one implementation, the blade may be equipped with four pockets, each capable of receiving an M-CARD, for a total of twenty-four simultaneous program decryptions. In response to instructions received from the control module 130, the blade may route demodulated data through the pocket and corresponding cryptographic engine for decryption to an unencrypted transport stream. Although the QAM input module may be adapted to support use of a cryptographic engine, it may be configured to process data without using that function. For example, in response to instructions received from control module 130, the blade can bypass a given pocket and provide a transport stream to the backplane without applying any decryption. Alternatively, a pocket could be filled with a dummy or relay card that simply transfers data back to the blade without applying a cryptographic function.

Another input module type is an ATSC input module. The ATSC input module is adapted to receive 8VSB-modulated signals such as broadcast signals from an external antenna that is connected to the front of the module via a coaxial cable. The ATSC input module is configured to demodulate such signals to digital transport streams that can be provided to other modules via the backplane 120. In one implementation, the ATSC input module is equipped with four independent tuners that can simultaneously demodulate four input signals for further processing. Each ATSC signal includes Program and System Information Protocol (PSIP) tables that include metadata about the programs in the transport stream, such as channel information and electronic program guide information. The ATSC tuner may be configured to provide PSIP data along with the transport stream to the backplane for further processing or delivery through an output module. Optionally, PSIP data may be processed separately for creation of a customized channel line-up and/or customized electronic program guide.

Another input module type is a satellite input module, which is adapted to receive a modulated signal from an external satellite receiver connected through the front of the module and further configured to demodulate such signals to digital transport streams that can be provided to other modules via the backplane 120. A satellite input module may be configured to process either or both of 8PSK- or QPSK-modulated signals.

Another input module type is a local input module, which may be adapted to receive a high-definition program or other content from one of several inputs on the front of the module, and configured to deliver a transport stream to the backplane 120. Locally-generated content can be utilized in variety of ways. For example, locally-generated content can be continuously delivered to the backplane for use in a dedicated program/channel for delivery within the enterprise network. Examples of such uses could be a hotel directory and service information, a campus television or radio station, an advertising vehicle, or live transmission of nearby events. Locally-generated content could be queued in memory for discrete delivery. Local input module may be configured to store one or more locally-generated programs received from the inputs in a buffer or carousel, and subsequently play out one or more of such programs in response to a request from control module 130. For example, local advertising can be inserted into content streams to augment or overwrite other portions of programs as they are delivered within the enterprise network.

Service modules may also be in the form of output-generating modules, such as a QAM output module. The QAM output module is configured to receive output instructions from the control module and transport streams via the backplane and assemble an output transport stream based on the output instructions. Optionally, QAM module may also include a digital up-converter and/or digital IP-to-QAM converter functionality for enhanced processing of the received transport streams. The output transport stream can then be modulated to an output signal that is transmitted through, for example, a coaxial connection on the front of the QAM module. In implementations, the QAM output module may generate thirty-two (32) QAM-256 or sixty-four (64) QAM-256 carriers, depending on application needs.

Another type of service module is a DOCSIS module compatible the DOCSIS 3.1 and/or Full Duplex DOCSIS 3.1 suite of specifications. A DOCSIS module may be configured to receive output instructions from the control module and transport streams via the backplane and assemble an output transport stream based on the output instructions, and may have enhanced processing functions such as those described above for the QAM output device. The output transport stream can then be modulated to an output signal that is transmitted through, for example, a coaxial connection. In implementations, the DOCSIS module may generate QAM-4096 carriers utilizing Orthogonal Frequency Division Multiplexing (OFDM). The DOCSIS module may also be adapted to receive modulated signals compliant with the DOCSIS 3.1 specifications through a coaxial cable connected through the front of the module and further configured to demodulate such signals to digital transport streams that can be provided to other modules via the backplane 120.

Another service module type is an IP module, which is adapted to send and receive data from an Internet Protocol (IP-based) network, such as the Internet or a Local Area Network (LAN), through an IP port 143 of FIG. 1 (such as Ethernet) located on the front of the module. Optionally, an IP module may be adapted to receive alternate networking connection formats, such as fiber optic, small form-factor pluggable (SFP), or even coaxial. The IP module may be configured to serve a variety of functions in an IPTV system, similar to those described above regarding the IP functions of the exemplary control module 130. IP module may be configured to extract transport streams or specific programs from an IP input, ranging from a large-scale service provider feed to a locally-generated content feed. IP module may be configured to provide a dedicated route for a particular type of content, for example video-on-demand services. IP module may be configured to provide supplementary data to other service modules. IP module can also be configured to function as an output module or a simultaneous input/output module. IP module may be equipped with a cryptographic engine, for example, DTCP-IP stream encryption, to securely deliver content to end devices within the enterprise network. Other cryptographic engines, such as commercial systems available from Verimatrix, Inc., industry standards like DVB-Simulcrypt, or other standardized security protocols, may be compatible with IP module.

Service modules may also include cryptographic modules to encrypt or decrypt transport streams separately from any particular input or output module. A cryptographic module may be configured to add encryption at the transport stream level, for example up to sixty programs using the commercially available Pro:Idiom system. An encrypted transport stream is then redelivered to the backplane for further processing, and the encrypted transport stream can thereafter be delivered within the enterprise network via multiple output modules or formats, such as IP and QAM outputs, or, as described above, as part of different program packages delivered to different subnetworks of the enterprise. A cryptographic module can also be in the form of a Digital Rights Management (DRM) module. The DRM module may be configured to act as a client managing a variety of content permissions and device verifications using multiple DRM systems and protocols.

Service modules 140 may also include a guide module which is configured to process guide information from a variety of sources and provide a custom program guide for the enterprise's channel lineup. For example, a guide module may be equipped with an IP port input that receives electronic program guide (EPG) data from an external network. The guide module may also be configured to extract PSIP-EPG data from a transport stream available through the backplane, or may be provided PSIP-EPG data independently of transport stream. Either of these sources or both can be inserted into a content transport stream as a supplement or replacement to any guide data already included in the stream. The guide module may also be configured to use EPG data to generate an audiovisual program describing and displaying the content of the EPG guide data. For example, the available program titles and descriptions can be displayed in a scrolling or flip-page chart that is then converted to a program in a transport stream that is delivered to other modules via the backplane. Alternately, the visual guide can be generated and superimposed on or combined with video from another program, such as for example locally-generated content described above. The visual guide program can be customized to include images, advertisements, or specific styling such as fonts and colors according to the preferences of the enterprise customer.

3. Exemplary Application in an Enterprise Setting

Figure 6:
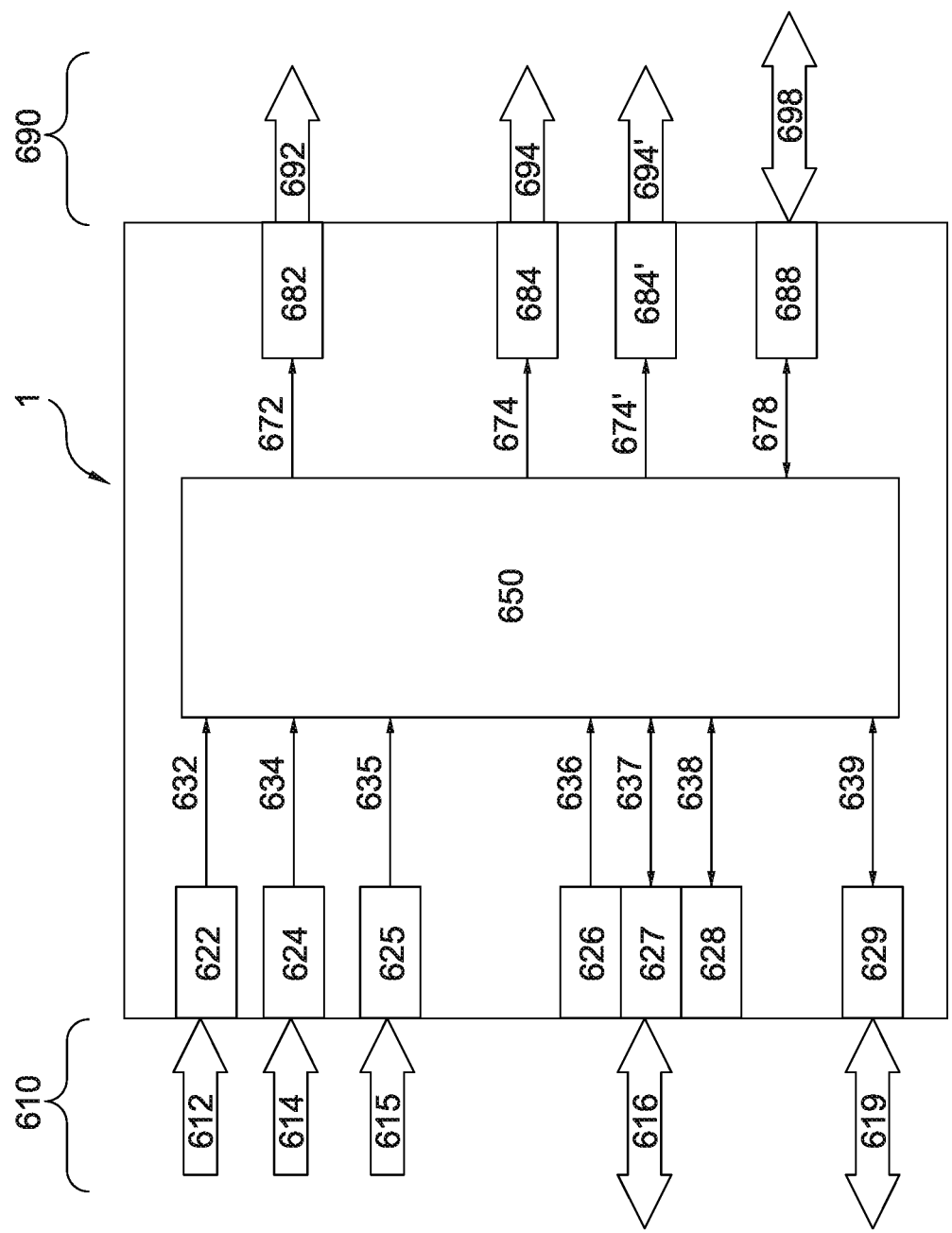
FIG. 6 is a block diagram of a processing function of an inventive gateway, such as FIG. 1.

Modules of several different types may be combined to provide various services in an enterprise network. For example, FIG. 6 is a block diagram of the inventive gateway 1 in relation to various external content networks 610 and the managed enterprise network 690. Satellite input 612 is processed through satellite demodulator 622 to provide transport streams 632. Likewise, cable input 614 is demodulated by a cable demodulator 624 to provide transport streams 634, and over-the-air input 615 is demodulated by demodulator 625 to provide transport streams 635. As discussed above, these demodulation processes may optionally include decryption processing. Transport streams 632, 634, 635 are provided to program and packet routing functions 650.

External IP network 616 can function as both an input to and output from the gateway 1, depending on the delivered services, and can do so simultaneously. For example, IP network 616 may provide audiovisual programming which can be decoded by IPTV module function 626 to provide additional transport streams 636 to routing functions 650. IP network 616 may also provide two-way communications through enterprise modem function 627, such that individual end user devices within the enterprise network 690 receive customized data services 637. Data services 637 may include essentially any IP traffic, such as general Internet traffic, video-on-demand (VOD) services, or over-the-top (OTT) services. The IP network 616 may also provide information specifically to gateway 1 that is not for delivery to end user devices. As a specific example, guide modem function 628 may receive guide data 638 from IP network 616. Control interface 629 may send and receive management and monitoring information 639 over an external IP network 616 or a local delivery 619. In accordance with the various input modules available having different physical network connections, IP network data 616 may be received over various forms, such as fiber, small form-factor pluggable, Ethernet, or coaxial cable. Again, cryptographic processing and/or digital rights management (DRM) functions can be applied to any of the sources as required by the content provider.

The central routing function 650 handles both transport streams and IP data. Routing function 650 receives management information 639 such as system configurations and module-specific configurations and settings through communications with control interface 639. Routing function 650 provides transport streams to output functions along with instructions for processing. For example, transport streams 672 may be sent to an encrypted modulator 682 while transport streams 674 may be sent to modulator 684 for delivery without an additional encryption step. Along with the streams, modulator functions 682, 684 receive instructions for which programs from the streams to include in outputs 692 and 694, respectively, and are configured to select packets from the streams 672, 674 corresponding to programs identified in the instructions. Bandwidth on output signals 682 and 684 may therefore be conserved, and subscription limits may be enforced, as unauthorized programs can be eliminated from the signals that are delivered within the enterprise network 690. Modulator functions 682, 684 may also be equipped with additional functionality, such as upconversion and transcoding, as may be suitable to a particular installation.

Routing function 650 sends and receives user IP data 678 to and from cable modem termination system (CMTS) function 688 for delivery over IP output 698 within the enterprise network 690. User IP data 678 can include transport stream programs 636 that were received from an IP source for delivery, but may also include programs from non-IP sources such as satellite, cable, or broadcast streams (632, 633, 634, respectively). User IP data may also include data service 637 such as VOD and OTT programming, as well as general Internet traffic. CMTS function 688 may provide IP outputs with or without additional encryption or DRM protections, according to user configurations. CMTS may also be configured to relay user data from enterprise network 698 back upstream as part of user IP data 678 for subsequent processing and routing through function 650.

Also illustrated in FIG. 6 is an additional modulator function 684'. Similar to the description previously in connection with FIG. 3, modulator functions 684 and 684' may be identical devices but can be configured to supply different content on output signals 694 and 694'. For example, the respective transport streams 674 and 674' supplied to each may differ, or the instructions received from routing function 650 may identify different programs for selection, or the instructions may include differences, or any combination of the preceding options. Thus, different sets of content can be provided to different subsets of an enterprise network through the use of the single inventive gateway 1. As the outputs supplied over each delivery method are fully-customizable, a single gateway 1 may also be implemented to service multiple enterprise networks 690. For example, two hotels could be located in proximity but have different subscriptions. Rather than each property maintaining their own (sets of) equipment, the gateway 1 may be configured to supply each property with its own unique channel lineup through distinct output modules.

Variations of the installation described in FIG. 6 are also contemplated. For example, fewer input methods may be used. A gateway may be implemented to combine local over-the-air programming with a commercial cable programming feed supplied over coaxial or fiber networks. Locally-generated content can be delivered to the enterprise network, but without otherwise substantially modifying the content feeds received from external providers, for example by inserting a new channel into a cable television channel lineup. The gateway can be implemented without two-way IP communications, such that end user devices are not connected to the Internet or other external networks through the gateway, and instead the gateway provides a one-way supply of content (from various sources), such as non-interactive television programming. The gateway can be implemented without traditional modulators, instead providing all content using IP within the enterprise network.

4. Upstream Isolation, Noise Suppression, and Network Architectures

Figure 9:
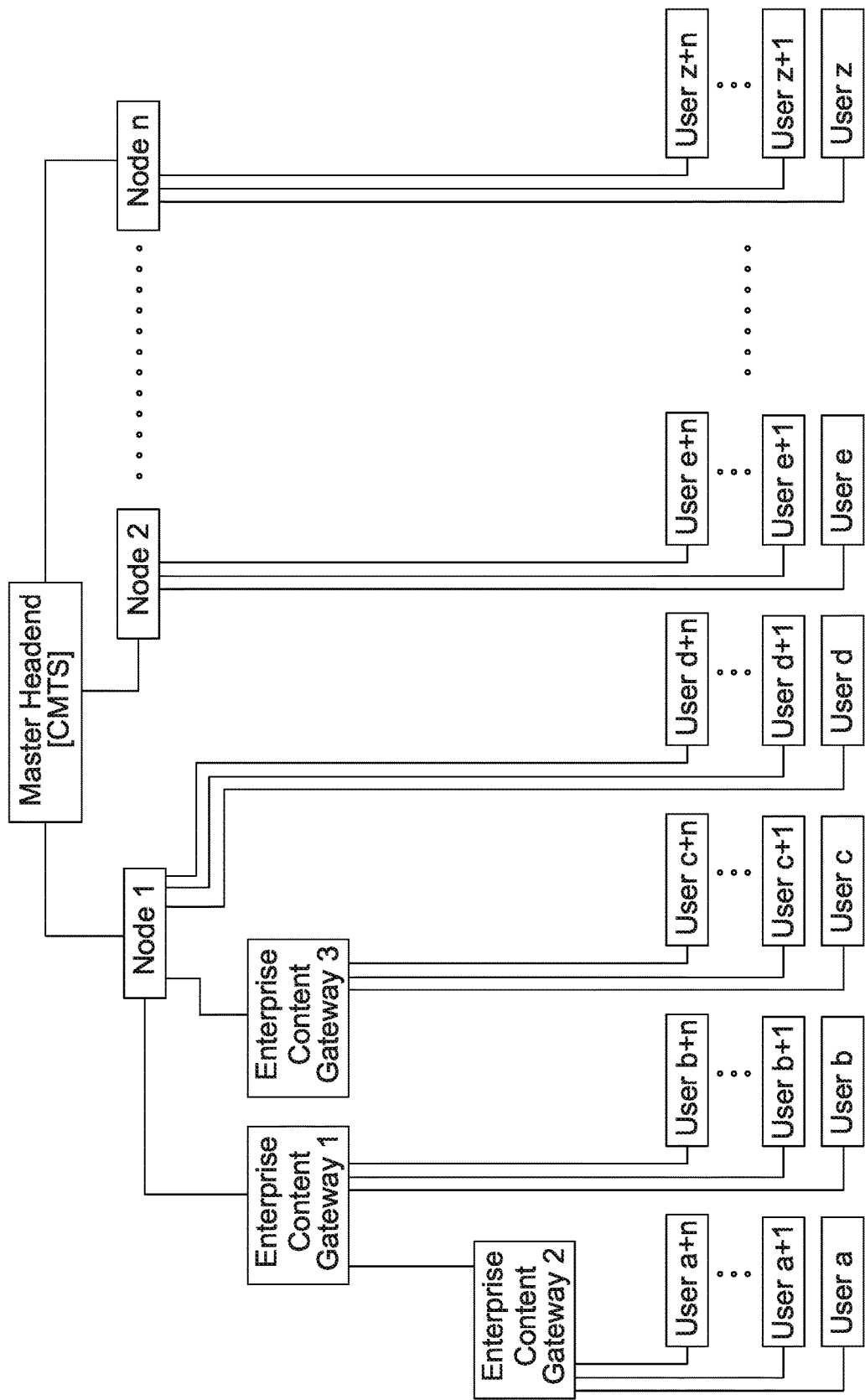
FIG. 9 is a diagram of a network architectures enabled by use of an inventive gateway, such as FIG. 1.

Referring to FIG. 9, in a typical hybrid-fiber coaxial (HFC) cable network, the service provider's cable modem termination system (CMTS) is located at a head-end and acts as a bridge between Internet/Ethernet and coaxial cable RF interfaces within the HFC network. In between the head-end and an end user's cable modem, the traditional HFC network delivers RF or optical signals over coaxial or fiber lines through facilities known as hubs and/or nodes. Each cable modem (or like devices, such as a set-top box) sending modulated signals upstream through the HFC generates noise, which is summed at the various processing locations, including a node. In order for the individual upstream signals to be reliably processed at the head-end they must maintain a sufficient signal-to-noise ratio, so facilities are limited in the number of upstream paths that are combined in order to cap the noise aggregation. For example, a typical service provider node may service approximately 250 locations. Adding a single enterprise installation, such as a hotel with 200-300 rooms, could overwhelm the existing node with the noise generated by so many additional devices and risk of loss of service unless substantial investment is made in the infrastructure for additional nodes and/or CMTSs by the HFC network. The enterprise gateway may be configured to address this problem.

Referring to FIG. 6, the combination of enterprise modem function 627, routing function 650, and CMTS function 688 may be configured to aggregate external network traffic. For example, routing function 150 may receive multiple requests for a VOD or streaming data service. Rather than immediately supply each of these requests upstream to an external content provider by repeating and/or summing the RF signals that are received from the enterprise network 690, the routing function 150 may collect several requests that are then sent, packaged together, upstream to external IP network 616, though the enterprise modem 628. Other types of user IP data 678 can be similarly packaged, including essentially any Internet traffic. In an implementation, the enterprise network 690 may include, for example, a plurality of set-top boxes (STB) and/or modems throughout a facility. Each STB/modem provides an upstream modulated RF signal through a medium (typically coaxial cable) to the gateway 1. The CMTS function 688 can demodulate each to digital packets. These packets are then aggregated in routing function 650 and remodulated through enterprise modem function 627. From the perspective of the external IP network 616, the inventive gateway 1 acts as a single endpoint (a high-capacity modem) for purposes of adding noise to the external network 616. Thus, the gateway 1 solves the multipoint-to-point noise aggregation problem inherent in HFC networks.

As seen in FIG. 9, the gateway 1 may also be used to extend and/or modify existing HFC network architectures. The capacity of a given node can be expanded. For example, multiple gateways can be deployed in parallel to substantially increase the number of locations serviced by a given HFC node, as seen in gateways 1 and 3 in FIG. 9. Each gateway can convert multiple upstream signal paths to one, so that, for example, a hotel with several hundred rooms can be serviced by two or three gateways rather than requiring nodes to be added to the HFC network. Multiple gateways can also be deployed in series, as illustrated with gateways 1 and 2 in FIG. 9. For example, an enterprise may have facilities that are not serviced by or inaccessible from existing trunk lines on the service provider's HFC network. Since a gateway may be adapted to communicate over many different transmission modes, if any transmission line can be extended to the inaccessible facility, then a gateway can be adapted to seamlessly service the additional facility within one centrally-managed enterprise network.

5. Error Detection and Handling

Figure 7:
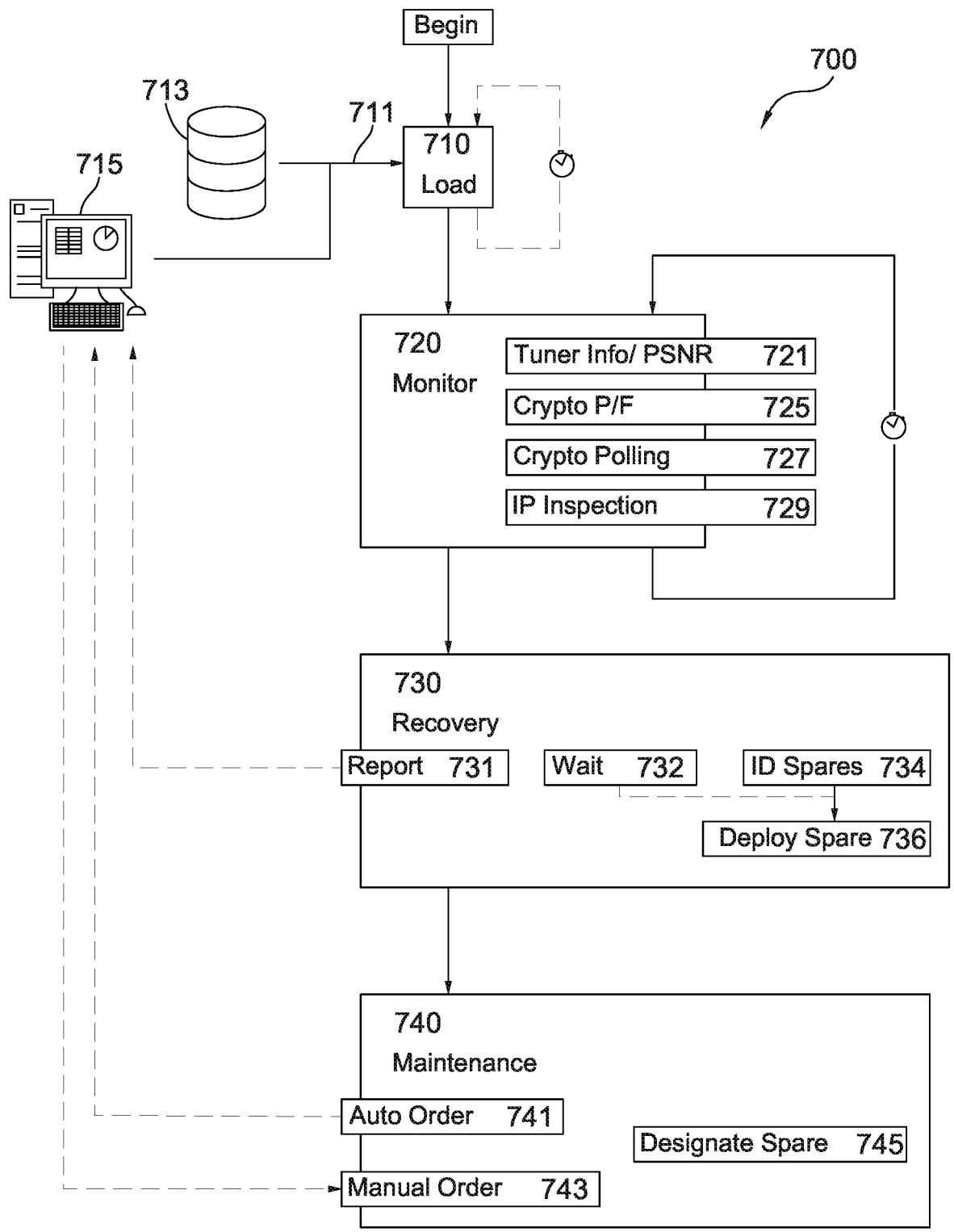
FIG. 7 is a diagram of methods relating to error detection and recovery in an inventive gateway, such as FIG. 1.

The flexible enterprise gateway system also implements robust error detection, handling, and recovery processes to minimize service interruptions. Illustrated in FIG. 7, a source manager function 700 may be implemented within control module 130. The source manager function 700 loads a system configuration 711 in step 710, either from memory 713 or in response to user input supplied through control interface 715. System configuration 711 includes information about the expected number of input streams and the source, format, and delivery method for each. Loading step 710 may be repeated in timed intervals or may be reinitialized in response to configuration changes made through the control interface 715. In monitoring step 720, the source manager monitors the status of signal sources, optionally in timed intervals. Source manager may receive information 721 about signals such as tuners within service modules 140 such as QAM input module or ATSC input module described above. Signal information 721 can include a signal-to-noise ratio to evaluate signal source status. Monitoring step 720 can also include steps of evaluating 725 a decryption process from a cryptographic engine, for example by determining, on a pass/fail basis, whether the engine is decrypting streams by inspecting a decrypted stream. The status of a cryptographic engine can also be evaluated in connection with polling 727 the cryptographic engine's communications, as described more fully below in reference to FIG. 8. In step 729, the status of an IP stream may be detected by inspecting packets received, and timing and bitrate may be used to determine stream presence. In addition to detecting stream presence, monitoring step 720 includes functions for monitoring health or correctness of streams.

Figure 8:
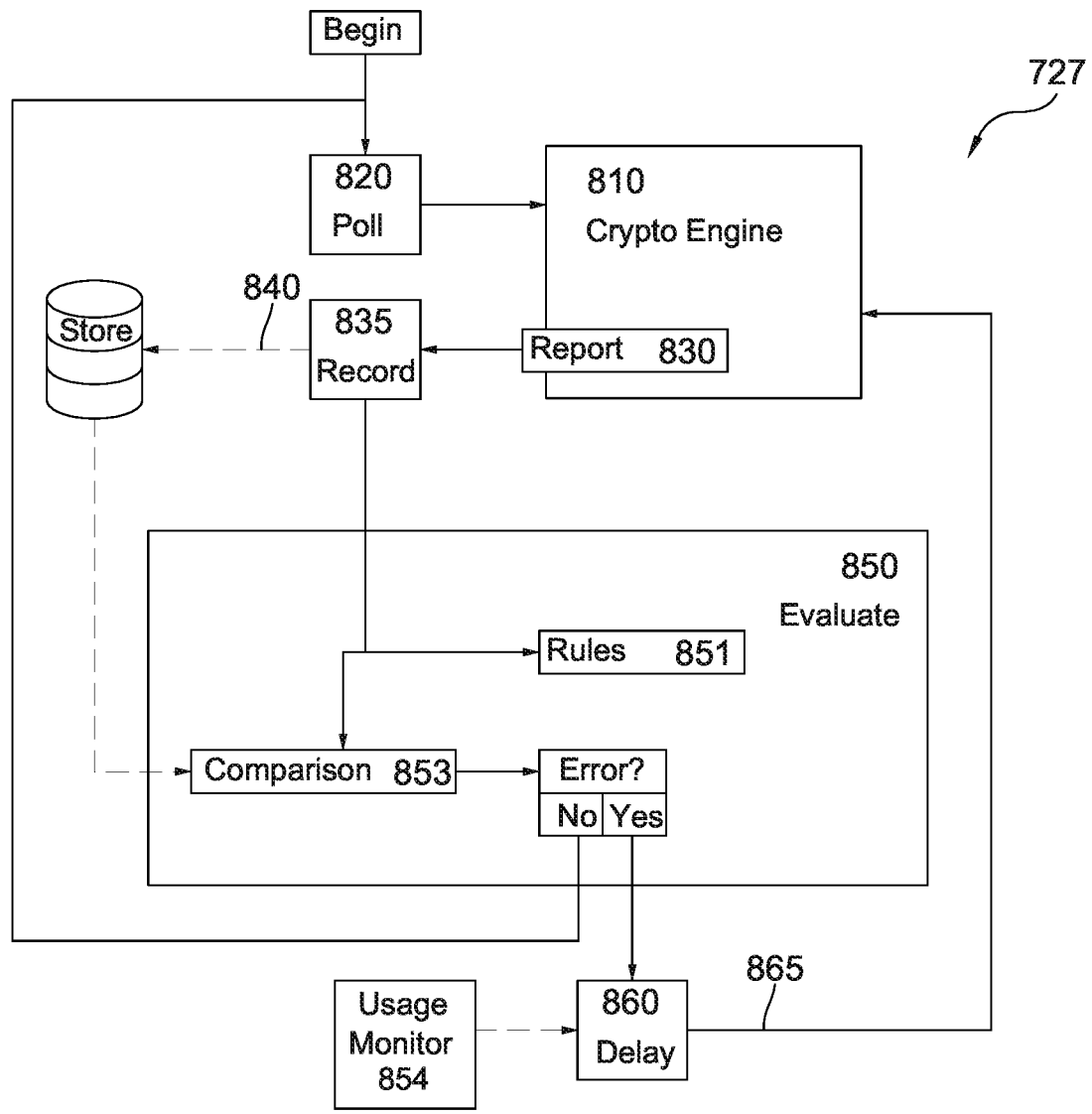
FIG. 8 is a diagram of methods relating to error detection and recovery in cryptographic engines relating to FIG. 7.

Referring to FIG. 8, a cryptographic engine 810 may be a standalone module function or as part of other module processing, such as a QAM input module described above. Keying information is provided to the cryptographic engine as part of a conditional access system and may be managed by a third-party such as a content provider (e.g., television network, streaming provider) or service provider (cable, satellite, fiber network operator). Key data is used by the engine to convert input data to output, such as decrypting an encrypted stream to a plaintext suitable for further processing. Frequently, as part of a conditional access system, a customer, such as an enterprise customer using an inventive gateway, is not provided direct access to key data. Instead, key information is stored in a secure area. Without such access, it may be more difficult to monitor streams for proper handling, including within the inventive methods described above. Such systems are prone to sudden, unexpected failures where communications between the cryptographic engine and the conditional access system are interrupted, causing service interruptions to the enterprise customer and/or end users within the enterprise network. For example, a provider may periodically change keys to ensure content remains protected and only available to authorized customers. However, such key changes are communicated in advance, such that conditional access system may negotiate new key data prior to expiration of current key. As the current key remains valid for some time, the engine may continue to successfully decrypt or encrypt data, and a failure in the communications is not detected until after the current key expires.

A cryptographic engine 810 and conditional access system protocol may provide for interrogation of the engine 810. In response to a query or poll in step 820, cryptographic engine 810 will report a record 835 relating to its key communications in step 830. Although key data 805 may not be reported, the report may indicate when the key data was last updated, or how many times the engine has communicated with the conditional access system, such as, for example, that communications relating to key data have occurred two times in the past twenty-four hours. In an extreme example, the cryptographic engine may report that it has never been in communication with the conditional access system. These records can indicate an error state in the engine. However, such an error may be limited to the engine's memory and/or communications with the conditional access system, as discussed above, and the cryptographic engine may continue to function properly prior to expiration of the key. Upon detecting an error state in step 850, a control message 865 can be sent to the cryptographic engine 810 to instruct it to restart, reinitialize and/or reauthenticate with the conditional access system. When the key communication error is detected prior to cryptographic failure, restarting the engine can be scheduled or delayed to minimize service interruptions to the enterprise customer and/or end user devices in the enterprise network in optional step 860. For example, the restart can be delayed to a predefined time, such as the middle of the night. A low usage time may also be determined by a monitoring process 854, and the automatic restart can be delayed until a usage communication 855 is received from the monitoring process 854.

In step 850, the record of key communications can be evaluated to detect an error state prior to the cryptographic failure in several ways. For example, the record can be compared to predefined rules in step 851. One rule, as noted above, could require a restart if the cryptographic engine reports that it has no record of key communications. Another rule could require a restart if the record reflects that the communications fall below a certain frequency threshold. The frequency threshold may be set based on the particular conditional access system employed, or could be predefined threshold subject to adjustment through the control interface. Optionally, after polling the cryptographic engine, a control process may store the record of key communications in step 840. The control process may periodically interrogate the engine, such that a new record of key communications is received. The new record may be compared to the stored record to determine a state of the engine in step 853. For example, if the new record indicates a drop in the frequency of communications relative to the prior record, an error state may be detected. Alternately, if inconsistencies are detected between the records such as, for example, the key communications are recorded as being received at different times, an error state may be detected. As a further option, a predefined rule may require a periodic automatic restart of the engine. Such a scheduled restart may prevent sudden failures as described above, and may be used in combination with the other error detection techniques described herein. Predefined rules and stored record comparisons may be used in the alternative or in combination, and may be further subject to a hierarchical or prioritized ordering or weighting in evaluating the state of the cryptographic engine.

Returning to FIG. 7, source manager function 700 provides for error handling and recovery in recovery step 730. Errors including signal loss, signal impairment such as RF signal weakness, decryption failures, and cryptographic engine service failures may be detected in monitoring step 720 as described above. Upon detection of an error, recovery step 730 reports cause of failure loss, if determinable, through control interface 715 in step 731. In the recovery step 730, multiple procedures are available to recover the signal. The function may wait for a configurable time period while continuing to check the source status in step 732. If the signal source is recovered (e.g., a temporary obstruction of an antenna is removed, upstream signal resumes), no further recovery steps are necessary. If not, additional recovery procedures may be executed after the configurable time period.

Recovery step 730 continues with the identification of hot spares in step 734. Hot spares may be used to supply additional resources and potentially recover the signal. Due to the modular nature of gateway 1, an installation may be configured with excess capacity relative to a particular application. All excess resources are considered "hot spares" for purposes of the recovery process. For example, a redundant set of QAM input modules may be installed. As another example, a cryptographic module may have unused processing resources. Hot spares may be identified by comparing the loaded system configuration 711 to the installed modules and their assigned data load relative to their processing capacity. Alternatively, hot spares may be identified by polling service modules. Optionally, the process 734 for identifying hot spares is executed during the configurable time period for waiting in step 732. Then, once the time period expires, a compatible hot spare resource can immediately be dispatched to acquire or correct the signal in step 736.

After recovery steps 730, the source manager function 700 proceeds to diagnostic step 740. The original (failed) signal source may be identified as needing maintenance in step 741 and reported to control interface 715. However, not all failures will require maintenance. For example, loss of physical layer link such as Ethernet indicates a hardware failure requiring maintenance, as is loss of RF peak-signal-to-noise ratio (PSNR) below a specified threshold for a specified time, where both the threshold and the time are user configurable. An operator may also manually designate the source as needing maintenance or field service through the control interface 715 in step 743. Conversely, maintenance may not be necessary if a module restart is in progress, or a PSNR is fluctuating (which may indicate a temporary obstruction). For example, if a cryptographic engine reestablishes authentication into a conditional access system, as described above, no additional maintenance is necessary. If the failed source is determined as not requiring maintenance, it may be designated as a hot spare 735 for future use in step 745.

The invention claimed is:

1. A method, comprising:
receiving an initialization message from a service module implemented on a blade unit having a processor and a memory configured to provide operating system, communications, and data processing functions, wherein the initialization message contains identification, capacity, type, and status information about the service module;
communicating the initialization message to a control interface;
comparing the initialization message to a stored system configuration plan;
sending a control message to the service module including instructions for processing a transport stream based on the stored system configuration plan;
routing the transport stream to the service module.

2. The method of claim 1, comprising:
receiving a request to modify the stored system configuration plan from the control interface;
modifying the stored system configuration plan;
identifying one or more service modules affected by the request.

3. The method of claim 1, comprising:
receiving a first transport stream from the service module;
selecting a first program from the first transport stream and collecting first packets from the first transport stream based on the first selected program;
receiving a second transport stream from an Internet Protocol (IP) data source;
selecting a second program from the second transport stream and collecting second packets from the second transport stream based on the second selected program;
combining the first packets and the second packets to create a first output transport stream;
modulating the first output transport stream to a first signal medium.

4. The method of claim 3, wherein receiving the first transport stream from the service module includes the transport stream derived from a demodulated over-the-air broadcast signal.

5. The method of claim 3, wherein receiving the first transport stream from the service module includes the transport stream derived from a demodulated RF CATV signal.

6. The method of claim 3, wherein receiving the first transport stream from the service module includes the transport stream derived from a demodulated DOCSIS 3.1-compliant signal.

7. The method of claim 3, wherein receiving the first transport stream from the service module includes the transport stream derived from a locally originated media delivery.

8. The method of claim 3, comprising:
selecting a third program from either the first or the second transport streams and collecting third packets based on the third program;
combining the third packets to create a second output transport stream;
modulating the second output stream to a second signal medium.

9. The method of claim 1, comprising:
detecting an error in a signal status by comparing the transport stream to the stored system configuration plan;
reporting the error to the control interface; and
recovering a signal source to correct the error and restore processing to comply with the stored system configuration plan.

10. The method of claim 9, comprising:
determining the cause of the error; and
reporting a maintenance request to the control interface based on the error.

11. A method, comprising:
loading a system configuration plan with information about an expected number and types of input signals;
receiving an input from a service module;
determining a signal status by comparing the input to the system configuration plan;
reporting an error in the signal status to a control interface;
identifying hot spares available to correct the error; and
deploying an identified hot spare to conform to the system configuration plan.

12. The method of claim 11, comprising:
determining a cryptographic status by inspecting a cryptographic engine;
reporting an error in the cryptographic status to the control interface.

13. The method of claim 12, wherein determining the cryptographic status comprises inspecting a decrypted data stream for headers and tables.

14. The method of claim 12, wherein determining the cryptographic status comprises:
(a) interrogating the cryptographic engine;
(b) receiving a record of key communications from the cryptographic engine; and
(c) automatically evaluating the record of key communications in relation to one or more predefined rules or a previously stored record to determine a state of the cryptographic engine.

15. The method of claim 14, comprising: waiting for a configurable time and repeating the step of determining the signal status.

16. The method of claim 11, wherein determining the signal status by comparing the input to the system configuration plan includes receiving and evaluating the input signal-to-noise ratio.

17. The method of claim 11, wherein determining the signal status by comparing the input to the system configuration plan includes inspecting Internet Protocol (IP) packets and evaluating timer and bitrate information from an IP stream.

18. The method of claim 11, comprising receiving a change to the system configuration plan from the control interface and repeating the step of determining the signal status.

19. The method of claim 11, comprising periodically repeating the step of determining the signal status on a timed interval.

20. The method of claim 11, comprising periodically repeating the step of loading the system configuration plan on a timed interval.

* * * * *